May 28, 1940. L. J. WHITE Re. 21,470

STORAGE AND DISPENSING APPARATUS FOR LIQUEFIED GAS

Original Filed Sept. 26, 1935 2 Sheets-Sheet 1

Inventor
L. J. White

By A. D. Adams
Attorney

May 28, 1940. L. J. WHITE Re. 21,470

STORAGE AND DISPENSING APPARATUS FOR LIQUEFIED GAS

Original Filed Sept. 26, 1935 2 Sheets-Sheet 2

Inventor
L. J. White

By A. D. Adams

Attorney

Reissued May 28, 1940 Re. 21,470

UNITED STATES PATENT OFFICE 21,470

STORAGE AND DISPENSING APPARATUS FOR LIQUEFIED GAS

Loyd J. White, San Antonio, Tex., assignor to Southern Steel Company, a corporation of Texas Original No. 2,042,439, dated May 26, 1936, Serial No. 42,337, September 26, 1935. Reissue No. 20,624, dated January 11, 1938, Serial No. 170,133, October 20, 1937. This application for reissue February 23, 1940, Serial No. 320,516

16 Claims. (Cl. 62—1)

This invention relates to storage and dispensing apparatus for highly volatile liquefied gases and, among other objects, aims to provide an improved compact and relatively simple installation adapted to be assembled at the factory and shipped as a complete unit ready to be installed to provide an automatic system for household and other uses. Another object is to provide a simple, safe and automatic underground system wherein all of the necessary filling, controlling and dispensing appliances are associated with a storage tank and arranged in a protecting casing to prevent flooding due to rains and exposure to extreme cold in winter.

Other aims and advantages of the invention will appear in the specification, when considered in connection with the accompanying drawings, wherein.

Figure 1:
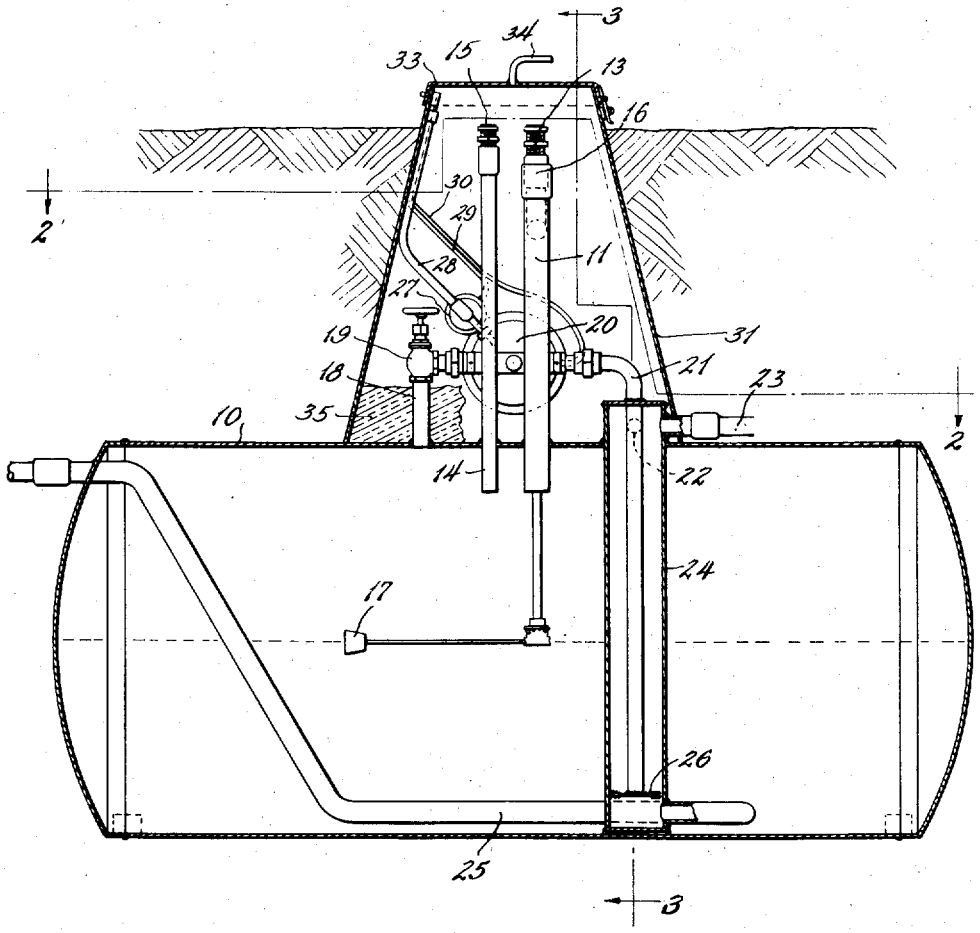
Fig. 1 is a vertical longitudinal sectional view of an installation embodying the invention.
Figure 2:
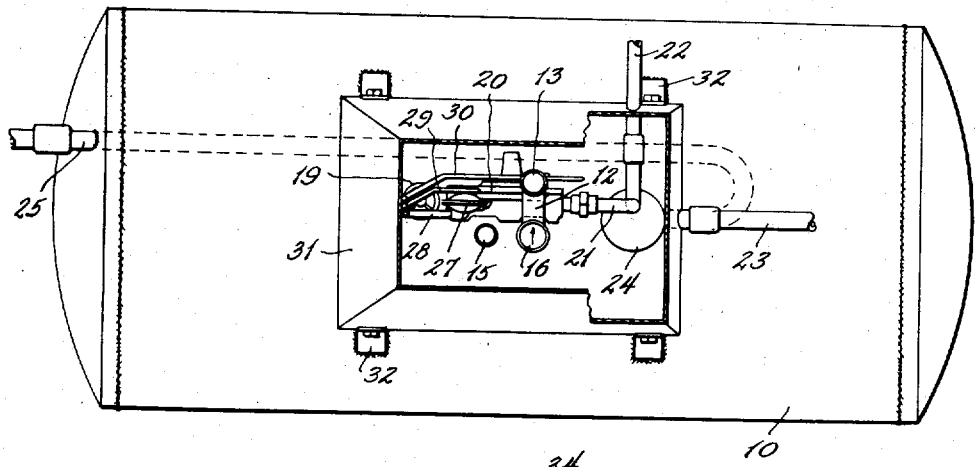
Fig. 2 is a sectional view taken on the line 2—2 of Fig. 1.
Figure 3:
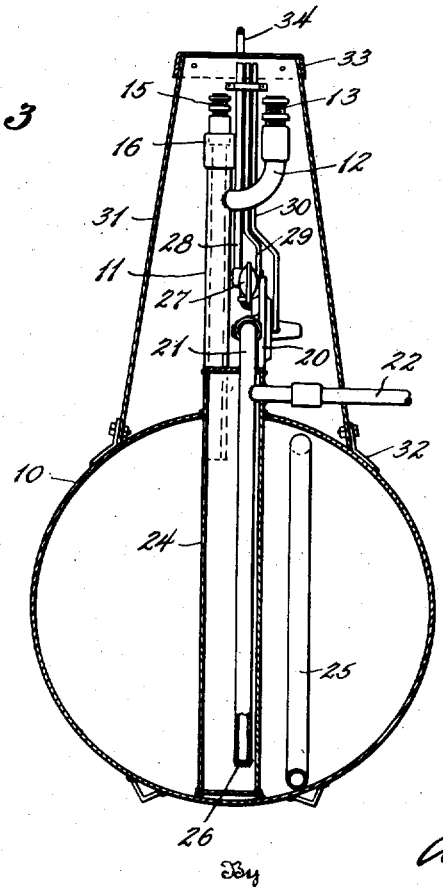
Fig. 3 is a sectional view taken on the line 3—3 of Fig. 1.

Referring particularly to the drawings, the installation there shown for illustrative purposes is designed for use in dispensing liquefied petroleum gases, such as normal butane, isobutane, propane or a mixture of butane and propane gases and the apparatus is adapted to be buried in the ground. In this instance, the liquefied gas is stored in a horizontally arranged cylindrical tank 10 of any suitable capacity. This tank is adapted to be partially filled with liquefied gas under pressure through a stand pipe 11 and a branch 12 having an ordinary inlet valve 13. As the liquefied gas is being charged into the tank, vaporized gas in the tank is allowed to escape into the air or into the filling tank through a pipe 14 having an outlet valve 15, to make room for the new supply of liquefied gas. The lower end of pipe 14 determines the level to which the liquefied gas can be raised. Some clearance or vapor space is required for safe operation.

The stand pipe 11 conveniently carries a level gage 16 at its upper end connected to an ordinary float 17 within the tank, although, it is to be understood that any other convenient type of level indicating apparatus may be employed.

The vapor under pressure is delivered through a conduit 18, having a hand valve 19; thence, through an ordinary pressure reducing regulator 20 to an outlet pipe 21 and a service main 22. In this instance, water is conducted through the liquefied gas in the tank to insure that it is always heated to the vaporization temperature, notwithstanding the outside temperature or temperature of the surrounding earth.

Herein, the domestic water supply is connected by a pipe 23 to a cylindrical conduit 24 extending vertically into the tank to its bottom from the outside. This conduit is shown as being closed at both ends. The water enters near the top and is charged from the bottom through a drain pipe 25 in heat exchanging relation with the liquefied gas and conveniently passes through one end of the tank, as shown. Thus, circulation of the water supplies supplemental heat to vaporize the liquid as fast as it is used and maintains a substantially uniform pressure in the tank.

The circulating water is also used in this instance to re-vaporize any condensed gas in the service conduit. For this purpose, the outlet pipe 21 extends into the cylindrical conduit 24 to a point near the bottom thereof, the lower end being closed and preferably supported by a cross bar or bracket 26.

The service pipe 22 extends through the wall of the conduit 24 near its upper end adjacent to the tank and is connected to the pipe 21 therein, thus providing a vertical trap to catch any condensed gas vapor. It will be understood that the pipe 22 is also buried underground below the frost line and drains toward the trap. This condensate is quickly revaporized by the heat derived from the circulating water in the cylindrical conduit. This is a very important feature, especially in plants used in extremely cold climates because the gas vapor condenses at a temperature between about 48° F. and 32° F. or less, depending on the mixture employed. Hence, the water which is always above the freezing point will supply sufficient heat to re-vaporize the liquefied gas.

As is usual in systems of this type, an ordinary relief valve 27 is connected to the low pressure side of the pressure regulator 20 to protect the appliances from any excessive pressure. This relief valve has an outlet conduit 28 and a vent pipe 29. Also, a vent pipe 30 is shown as being connected to the pressure regulator. All of these pipes are shown as extending above the ground level so that no water can submerge them and interfere with their functions.

To protect the mechanism outside the tank during shipment and after its installation in the ground, there is shown a sheet metal casing 31 which can be of any suitable shape but is preferably frusto-pyramidal, having four sides converging upwardly. The lower ends are shown as being cut to conform to the contour of the tank and opposite side walls are preferably bolted to angle brackets 32 welded on the tank. The top of the casing or housing is closed by a suitable cover 33 hinged or otherwise removably secured thereto. It is shown as having a pipe handle 34 providing a vent for the interior of the casing. Incidentally, the pipes 28, 29, and 30 are shown as being secured near their upper ends to one wall of the housing. It will be observed that the upper end of the housing 31 protrudes slightly above the ground so that the apparatus within is readily accessible by removing the cover and surface water cannot run into the casing.

It is important that the pressure regulator be protected from freezing temperatures in order that it may function properly. In mild climates the casing alone is sufficient for this purpose. In cold climates the interior of the casing is preferably filled or lined with any suitable heat insulating material, such as asbestos or rock wool. In Fig. 1, the casing has a layer 35 of such lining which is preferably a few inches thick. It retards the escape of the earth's heat through the top of the casing. It will be understood that the earth's heat is used to help vaporise the liquefied gas in the tank. In some instances the casing will be filled with such insulation to a point above the level of the regulator 20 better to protect the apparatus in cold weather.

Thus, it will be clear that the apparatus is well protected. The whole unit may be assembled and tested at the factory and the casing will serve to prevent damage to the parts during shipment. Otherwise, the pipes might be knocked or jarred and cause dangerous leaks. Moreover, the casing makes all of the apparatus easily accessible for service, inspection and repairs. Also, the complete units may be displayed in sales rooms and present an attractive appearance.

Obviously, the present invention is not restricted to the particular embodiment thereof herein shown and described. Moreover, it is not indispensable that all the features of the invention be used conjointly, since they may be employed advantageously in various combinations and subcombinations.

What is claimed is:

1. In a liquefied gas storage and dispensing plant of the class described, a storage tank; dispensing means connected to the tank for delivering gas at a low pressure therefrom; a service pipe leading from said dispensing means having a portion projecting into said tank; a water conduit around said pipe within the tank providing a heat exchanger for revaporizing condensed gas therein; and water pipes connected to said conduit for circulating water in heat exchanging relation to liquefied gas in the tank.

2. A storage and dispensing system for liquefied petroleum gases under pressure comprising, in combination, a storage tank buried in the ground below the frost line to absorb heat from the surrounding earth for vaporizing the liquefied gas therein; a valved filling conduit for the storage tank; a valved gas dispensing conduit connected to the tank; an automatic pressure regulator connected to the dispensing conduit; a protecting casing above the tank and providing a housing for said filling conduit, said valve and said pressure regulator; a service pipe connected to the regulator and extending outwardly from the casing also buried below the frost line; a safety vent pipe connected to said pressure regulator and projecting upwardly into said protecting casing to a point near the top; and a vented removable cover for said casing above the ground so that the parts in said casing are accessible for removal or repairs.

3. In a liquefied gas storage and dispensing plant of the character described, a storage tank for holding the liquefied gas under pressure adapted to be buried in the ground; filling and dispensing devices, including a pressure regulator and valved conduits secured to the tank and projecting upwardly therefrom; a protecting casing for said devices arranged entirely above and secured to the tank and partially buried in the ground with the tank; a vent for said regulator extending to a point beneath the top of the casing; and a removable cover for said casing to permit access to said devices.

4. A liquefied gas storage and dispensing plant as set forth in claim 3 wherein said filling and dispensing devices and said protecting casing are assembled on the tank at the factory or assembling plant so that the casing will protect the devices during shipment.

5. In a liquefied gas storage and dispensing system of the class described, a storage tank for holding liquefied gas under pressure installed underground below the frost line in heat exchanging relation with the surrounding earth to absorb heat for vaporizing the liquefied gas therein; filling and dispensing devices, including a pressure regulator and valved conduits connected to and arranged above the tank; a protecting casing of weather-proof sheet material for said devices arranged entirely above and supported by the tank and accessible from above the ground; a cover on said casing permitting gas to discharge therefrom; a vent for the regulator discharging into the casing and, thence, to the atmosphere; and a service pipe connected to the regulator extending outwardly underground through the lower portion of the casing, also below the frost line.

6. A liquefied gas storage and dispensing system as set forth in claim 5 wherein the tank is cylindrical and buried horizontally in the ground and said devices and casing are factory assembled on the side of the tank and the regulator is removably connected to a dispensing conduit and service pipe, the casing being of sufficient size as to permit removal of the regulator through the top.

7. In a liquefied gas storage and dispensing system of the class described, a cylindrical storage tank for holding liquefied gas under pressure installed horizontally underground below the frost line in heat exchanging relation with the surrounding earth to absorb heat for vaporizing the liquefied gas therein; filling and dispensing devices, including a pressure regulator and valved conduits connected to and arranged above the tank also below the ground level; a protecting casing of weather-proof material about said devices accessible from above the ground and rigidly mounted with respect to the tank; a cover for said casing shielding said devices and affording access thereto; and a gas service pipe leading downwardly from said regulator within the casing and outwardly therefrom closely adjacent to the tank.

8. A liquefied gas storage and dispensing system as set forth in claim 7 wherein a cut-off valve is provided in the gas delivery conduit and the regulator is removably connected to said conduit and service pipe, the casing being of sufficient size to permit the manipulation of a wrench and the removal of the regulator through the top.

9. In a liquefied gas storage and dispensing system of the class described, a cylindrical storage tank for holding liquefied gas under pressure installed horizontally underground below the frost line in heat exchanging relation with the surrounding earth to absorb heat for vaporizing the liquefied gas therein; filling and dispensing devices, including a pressure regulator and valved conduits connected to and arranged above the tank also below the ground level; a metal protecting casing above the top side of and rigidly secured with respect to the tank about said devices and accessible from above the ground; a removable cover for the casing permitting access to said devices; and a safety relief valve for said regulator connected to discharge vented gas into the casing and, thence, to the atmosphere.

10. A gas storage and dispensing system as set forth in claim 9 wherein heat insulating material is placed in said casing to maintain the temperature within the casing about the same as that in the tank and thereby prevents the gas from being condensed in the dispensing conduit and regulator during cold weather.

11. In a liquefied gas storage and dispensing system of the class described, a storage tank for holding liquefied gas under pressure adapted to be installed horizontally underground in heat exchanging relation with the surrounding earth to absorb heat for vaporizing the liquefied gas therein; valved filling and vapor return conduits connected to the tank; a gas dispensing conduit connected to and arranged above the tank; control devices, including a pressure regulator in the conduit and a safety relief valve also below the ground level; an underground service pipe leading from said regulator; a metal protecting casing assembled on the tank about said control devices and said filling and vapor return conduits preventing breakage of said devices and conduits during shipment and affording access to them from the ground level and also providing a vent to the atmosphere for said safety relief valve; and a cover for said casing shielding said devices and conduits.

12. In a liquefied gas storage and dispensing system of the class described, a cylindrical storage tank for holding liquefied gas under pressure and installed underground below the frost line in heat exchanging relation with the surrounding earth to absorb heat for vaporizing the liquefied gas therein; a rigid, weather-proof casing above and securely mounted with respect to tank extending to the ground level; a gas dispensing conduit connected to the tank and having a manually operable cut-off valve in the casing; a pressure regulator and a safety relief valve connected to said conduit and also arranged in the casing; valved filling and vapor return conduits extending upwardly in the casing; and a cover for the casing to permit easy access to all of said devices and providing a vent for any gas discharged into the casing by said safety relief valve.

13. In a liquefied gas storage and dispensing system of the class described, an underground pressure storage tank; a gas dispensing conduit connected to the tank and having a pressure regulator; heat exchanging means associated with the tank to vaporize the liquefied gas therein and maintain a continuous supply of gas under pressure; means to supply water to said heat exchanging means; and a gas service pipe having a portion extending into the tank and also heated by said heat exchanging means to revaporize condensate which collects in the service pipe.

14. In a liquefied gas storage and dispensing system of the class described, an underground storage tank for holding liquefied gas under pressure arranged in heat exchanging relation with the surrounding earth below the frost line to absorb heat for vaporizing the liquefied gas therein; a dispensing pipe connected to and arranged above the tank; a pressure regulator in the dispensing pipe; a service pipe also above the tank leading downwardly from the low pressure side of the regulator and extending laterally underground from a point closely adjacent to the tank; a protecting casing for said regulator and dispensing pipe arranged entirely above the tank and affording access to the regulator from above the ground; and a safety relief valve connected to prevent an excess pressure from being built up in the service pipe and having a vent pipe discharging into the casing near its top and thence to the atmosphere.

15. In a liquefied gas storage and dispensing system of the class described, a storage tank buried in the ground in heat exchanging relation with the surrounding earth to hold liquefied gas under pressure; filling and dispensing devices connected to the tank including a conduit having a pressure regulator and a gas service pipe connected to the low pressure side of said regulator and having its lowest point adjacent to the top of the tank; and a branch on the service pipe extending downwardly into the tank and having a closed lower end, whereby any condensate formed in the service pipe will drain into the branch and be revaporized.

16. In a liquefied gas storage and dispensing system of the class described, an underground storage tank; a gas service pipe connected to deliver gas from the tank and having its lowest point buried in the ground; and a heat exchanger connected to and depending from the lowest portion of the service pipe into which condensed gas drains, whereby the condensate is revaporized and returned to the service pipe.

LOYD J. WHITE.